(12) United States Patent
Nenoff et al.

(10) Patent No.: US 7,998,239 B1
(45) Date of Patent: Aug. 16, 2011

(54) ALLOY NANOPARTICLE SYNTHESIS USING IONIZING RADIATION

(75) Inventors: Tina M. Nenoff, Sandia Park, NM (US);
Dana A. Powers, Albuquerque, NM (US); Zhenyuan Zhang, Durham, NC (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 12/620,633

(22) Filed: Nov. 18, 2009

Related U.S. Application Data

(60) Provisional application No. 61/116,321, filed on Nov. 20, 2008.

(51) Int. Cl.
*B22F 9/24* (2006.01)

(52) U.S. Cl. ............... 75/345; 75/370; 75/371; 75/372; 75/373; 75/374

(58) Field of Classification Search .............. 75/345, 75/370–374, 10.13
See application file for complete search history.

(56) References Cited

U.S. PATENT DOCUMENTS

| | | | |
|---|---|---|---|
| 3,826,726 A | 7/1974 | Phillipp | |
| 4,629,709 A | 12/1986 | Belloni Cofler et al. | |
| 4,745,094 A | 5/1988 | Belloni et al. | |
| 5,453,297 A | 9/1995 | Dye et al. | |
| 5,486,225 A | 1/1996 | Dye et al. | |
| 5,492,879 A | 2/1996 | Dye et al. | |
| 6,350,408 B1 | 2/2002 | Dye et al. | |
| 6,387,494 B1 * | 5/2002 | Yanagida et al. | 428/402 |
| 7,566,440 B2 * | 7/2009 | Lim et al. | 423/648.1 |
| 7,789,935 B2 * | 9/2010 | Chretien et al. | 75/371 |
| 2007/0134902 A1 * | 6/2007 | Bertino et al. | 438/610 |

OTHER PUBLICATIONS

Kevan, Larry. "Electron Spin Echo Studies of Solvation Structure". Journal of Physical Chemistry. vol. 85, 1981. pp. 1626-1636.*
Zhenqi Chang, et al ., "In situ coating of microreactor inner wall with nickel nano-particles prepared by y-irradiation in magnetic field", Radiation Physics and Chemistry, vol. 69, (2004) pp. 445-449.
Arnim Henglein, et al, "Formation and Absorption spectrum of Copper Nanoparticles from the Radiolytic Reduction of $Cu(CN)_2$", Journal of Physical Chemistry, 2000, vol. 104, No. 6, pp. 1206-1211.
Arnim Henglein et al, "Radiolytic Control of the Size of Colloidal Gold Nanoparticles", Langmuir, 1998, vol. 14, No. 26, pp. 7392-7396.
Arnim Henglein., "Radiolytic Preparation of Ultrafine Colloidal Gold Particles in Aqueous Solution: Optical Spectrum, Controlled Growth, and Some Chemical Reactions", Langmuir, 1999, vol. 15, No. 20, pp. 6738-6744.
Fu-Ken Liu et al, "Using y-irradiation to synthesize Ag nanoparticles", Material Letters 61 (2007) pp. 2402-2405.
J. L. Marignier et al., "Microaggregates of non-noble metals and bimetallic alloys prepared by radiation-induced reduction", Nature, vol. 317, Sep. 1985, pp. 344-345.
M. Treguer, et al, "Dose Rate Effects on Radiolytic Synthesis of Gold-Silver Bimetallic Clusters in Solution", Journal of Physical Chemistry, 1998, vol. 102, pp. 4310-4321.

* cited by examiner

*Primary Examiner* — George Wyszomierski
*Assistant Examiner* — Tima M McGuthry Banks
(74) *Attorney, Agent, or Firm* — Carol I Ashby

(57) ABSTRACT

A method of forming stable nanoparticles comprising substantially uniform alloys of metals. A high dose of ionizing radiation is used to generate high concentrations of solvated electrons and optionally radical reducing species that rapidly reduce a mixture of metal ion source species to form alloy nanoparticles. The method can make uniform alloy nanoparticles from normally immiscible metals by overcoming the thermodynamic limitations that would preferentially produce core-shell nanoparticles.

17 Claims, 4 Drawing Sheets

| | W | $W_{0.5}$-$Ni_{0.5}$ | $W_{0.3}$-$Ni_{0.7}$ | | Co | $Co_{0.5}$-$Ni_{0.5}$ |
|---|---|---|---|---|---|---|
| $[WO_4^{2-}]$, ×$10^{-4}$ M | 2 | 1 | 0.6 | $[Co^{2+}]$, ×$10^{-4}$ M | 2 | 1 |
| $[Ni^{2+}]$, ×$10^{-4}$ M | 0 | 1 | 1.4 | $[Ni^{2+}]$, ×$10^{-4}$ M | 0 | 1 |
| $[WO_4^{2-}] + [Ni^{2+}]$, ×$10^{-4}$ M | 2 | 2 | 2 | $[Co^{2+}] + [Ni^{2+}]$, ×$10^{-4}$ M | 2 | 2 |
| $[WO_4^{2-}]:[Ni^{2+}]$ | 1:0 | 1:1 | 3:7 | $[Co^{2+}]:[Ni^{2+}]$ | 1:0 | 1:1 |

Table 1. Amounts of $WO_4^{2-}$, $Co^{2+}$, and $Ni^{2+}$ ions used to prepare W, W-Ni, Co, and Co-Ni alloy nanoparticles.

| | Ag | $Ag_{0.9}$-$Ni_{0.1}$ | $Ag_{0.7}$-$Ni_{0.3}$ | $Ag_{0.5}$-$Ni_{0.5}$ | $Ag_{0.3}$-$Ni_{0.7}$ | Ni |
|---|---|---|---|---|---|---|
| $[Ag^+]$, ×$10^{-4}$ M | 2 | 1.8 | 1.4 | 1 | 0.6 | 0 |
| $[Ni^{2+}]$, ×$10^{-4}$ M | 0 | 0.2 | 0.6 | 1 | 1.4 | 2 |
| $[Ag^+] + [Ni^{2+}]$, ×$10^{-4}$ M | 2 | 2 | 2 | 2 | 2 | 2 |
| $[Ag^+]:[Ni^{2+}]$ | 1:0 | 9:1 | 7:3 | 1:1 | 3:7 | 0:1 |

Table 2. Amounts of of $Ag^+$ and $Ni^{2+}$ used to prepare Ag-Ni alloy nanoparticles.

Fig. 3

ALLOY NANOPARTICLE SYNTHESIS USING IONIZING RADIATION

This patent application claims priority benefit from U.S. provisional patent application Ser. No. 61/116,321, filed on Nov. 20, 2008, which is incorporated herein by reference.

The United States Government has rights in this invention pursuant to Department of Energy Contract No. DE-AC04-94AL85000 with Sandia Corporation.

BACKGROUND OF THE INVENTION

This invention relates to a method of forming stable nanoparticles (NPs) comprising uniform alloys of metals. The formation of substantially homogeneous alloys from metals that are normally immiscible is a difficult thing to accomplish, and reliable techniques for producing such alloys are generally not available. For example, bimetallic nanoparticles fall into two general categories: alloy and core-shell. The category of nanoparticles for a particular set of metals is generally dictated by the thermodynamically most favorable composition, and immiscible metals generally form core-shell nanoparticles rather than uniform alloy nanoparticles. A large lattice mismatch between different metals generally makes a core-shell structure more thermodynamically favorable and precludes formation of alloy nanoparticles.

There is a need for improved methods for forming nanoparticles of superalloys. A superalloy is a heat-resistant alloy often based on nickel or cobalt that exhibit high strength and resistance to surface degradation at elevated temperatures. Superalloys containing tungsten are used in turbine blades and ware-resistant parts and coatings.

BRIEF DESCRIPTION OF THE DRAWINGS

The accompanying drawings, which are incorporated in and form part of the specification, illustrate some embodiments of the present invention and, together with the description, serve to explain the principles of the invention.

FIG. 3 presents Tables 1 and 2 showing reaction solution compositions for different nanoparticle compositions.

DETAILED DESCRIPTION OF THE INVENTION

This invention comprises a method of forming homogeneous alloy nanoparticles from metals using high dose rates of ionizing radiation to produce a kinetically controlled reduction reaction in preference to a thermodynamically controlled reduction reaction. Dose rates greater than approximately 250 rad/sec are suitable for embodiments of this invention. Lower dose rates may also be employed provided they are sufficient to preferentially produce the kinetically controlled reduction reaction. Performance of the reduction in a solution that has been deaerated leads to the formation of the desired alloy metal nanoparticles. Deaeration is important to prevent undesirable oxidation reactions cause by dissolved oxygen. Embodiments of this invention include homogeneous alloy nanoparticles comprising metals that are generally miscible or generally immiscible. The large lattice mismatches between two metals that are immiscible typically causes core-shell nanoparticles to form because that is the thermodynamically more stable form. A high dose rate of ionizing irradiation is employed to produce kinetically favored alloy nanoparticles that would normally form core-shell nanoparticles if the nanoparticle formation reactions occur under thermodynamically controlled conditions.

A radiolytic process using radiation dose rates sufficient to produce kinetically controlled reactions is employed in embodiments of this invention. A variety of types of ionizing radiation can be used in embodiments of this invention. The radiation dose rate is selected to be sufficiently high that there are adequate electrons of sufficiently high energy to sufficiently simultaneously reduce metal ions of differing reduction potentials that the difference in reduction potential does not lead to a preferential reduction of the more readily reduced metal followed by reduction of the less readily reduced metal, as occurs in the formation of core-shell nanoparticles. In some embodiments, gamma radiation is useful to prepare the metallic nanoparticles. Some advantages of using gamma radiation include 1) the controlled reduction of metal ions without using excess reducing agent or having undesired oxidation products from the chemical reductant, 2) a well-controlled rate of reaction since the number of reducing equivalents generated by radiation is well defined, 3) absorption of radiation without interference from light-absorbing solutes or products, and 4) uniform formation of the reducing agent in the solution. To form kinetically favored nanoparticles from immiscible metals, a high dose rate of gamma radiation is used. One convenient source of gamma radiation is a $^{60}$Co source. Other gamma ray sources may also be used. While other ionizing radiation sources require more complex hardware than a typical $^{60}$Co source, they may also be used in many and various embodiments of this invention.

Figure 1:
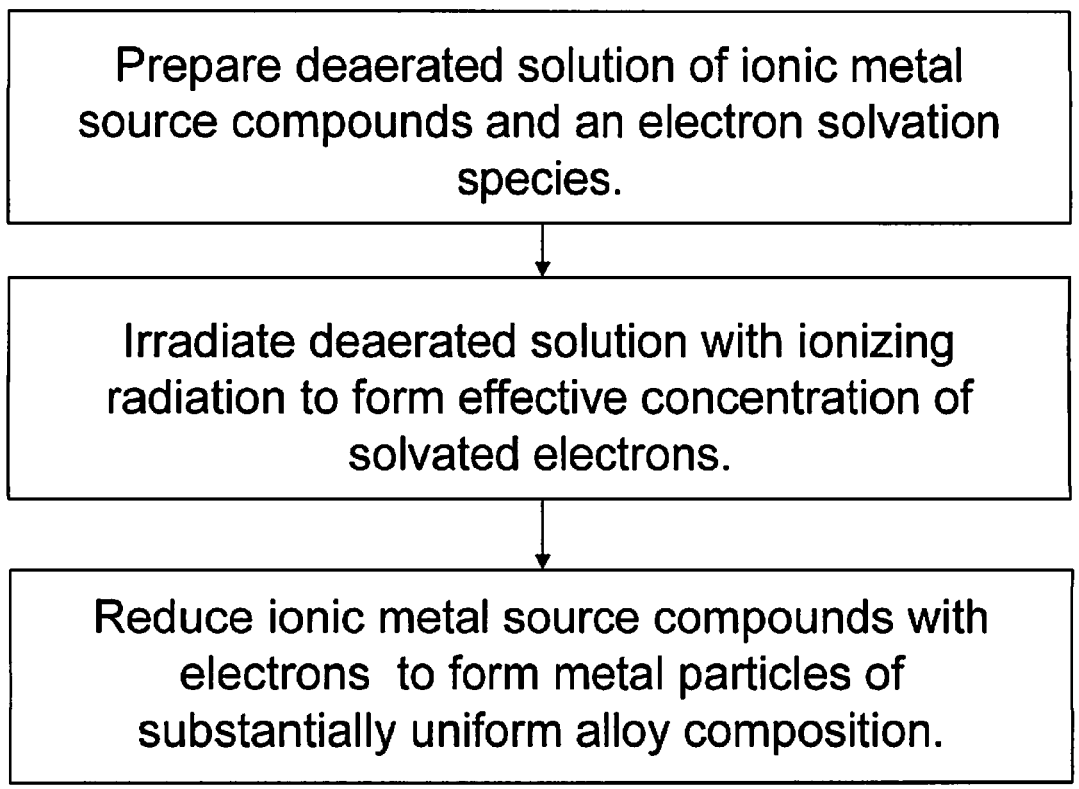
FIG. 1 illustrates the steps of one embodiment of the present invention.
Figure 2:
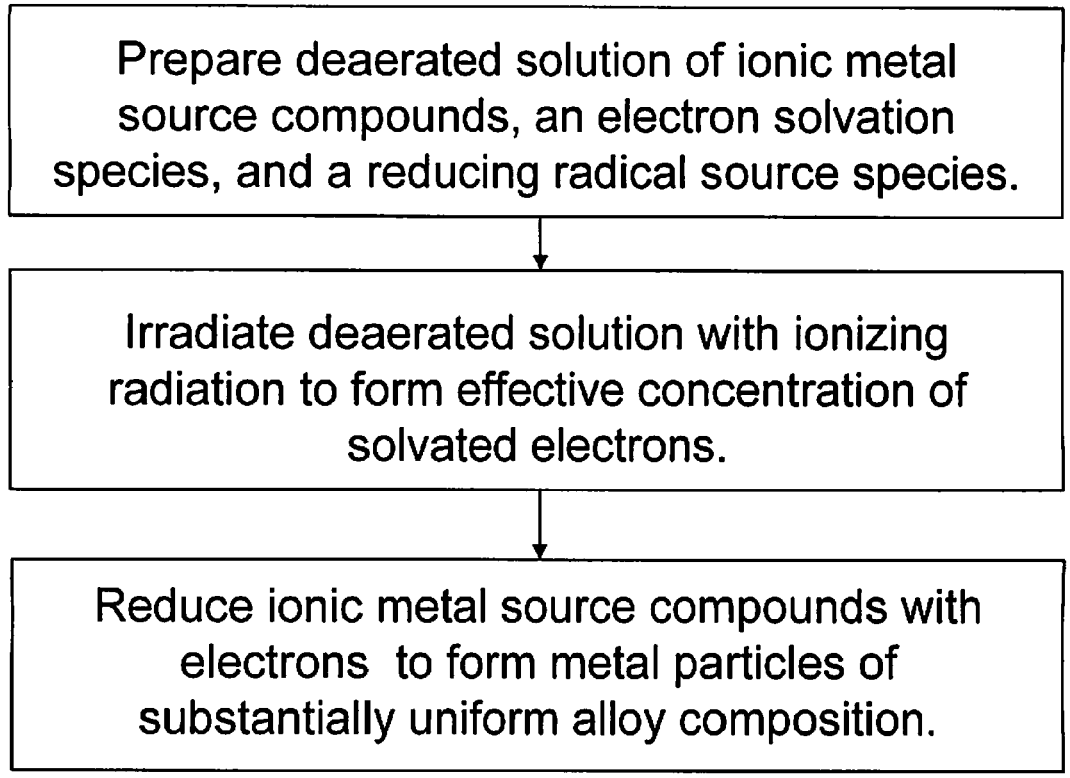
FIG. 2 illustrates the steps of another embodiment of the present invention.

FIGS. 1 and 2 present two groups of embodiments. FIG. 1 is a flow chart for embodiments of the present invention wherein the reaction solution need not contain a chemical precursor for forming a reducing radical. In such embodiments, electrons generated by irradiation are solvated and serve as the reducing species for reduction of the metal salts to form nanoparticles. FIG. 2 is a flow chart for embodiments wherein the reaction solution also contains a chemical precursor for forming a reducing radical. In such embodiments, electrons generated by irradiation are solvated and serve as a reducing species for reduction of the metal salts. Ionizing radiation produces hydrated electrons, H atoms, and hydroxyl radicals from water. In the presence of an alcohol, hydroxyalkyl radicals capable of reducing some metals are formed. For methanol, these radicals are hydroxymethyl radicals (.$CH_2OH$). When a reducing radical precursor is present in the solution, it can also contribute to the reduction of metal ions with a suitable redox potential.

In various embodiments of the present invention, W—Ni, Co—Ni, Pd—Ni, and Ag—Ni alloy particles of various metallic ratios have been produced. Other metallic ratios can be obtained by varying the relative concentration so ionic source species to approximate the desired stoichiometry of the final nanoparticles.

In some embodiments, W—Ni alloy nanoparticles of different stoichiometries were prepared using the following radiolytic methodology. A 50 mL aqueous solution containing 0.6 to $2\times10^{-4}$ M $Na_2WO_4$, 1.4 to $0\times10^{-4}$ M $NiSO_4$, $3\times10^{-4}$ M sodium citrate, 0.5 M methanol, and $1.5\times10^{-2}$ M poly-vinyl alcohol (PVA, $M_W$, 88,000) was deaerated by bubbling Ar for 12 mins. Other inert gases, such as, for example, $N_2$, Ne, He, Kr, Xe, and mixtures thereof with low concentrations of $H_2$ (a low concentration is one that minimizes explosion hazards, typically less than 5%) may also be employed as long as adequate removal of oxygen from the solution is achieved. The deaerated solution was irradiated using a $^{60}$Co-γ source at a dose rate of 435 rad/s for 37 min. The combined concentration of $WO_4^{2-}$ and $Ni^{2+}$ was kept at $2\times10^{-4}$ M while the ratio was adjusted to achieve nanoparticles of different stoichiometries. Table 1 provides a summary of concentrations employed for a selection of alloy nanoparticle compositions. Other compositions may be formed by appropriately altering the ratio of the ionic precursor species for W and Ni to approximate the concentration of each metal desired in the alloy nanoparticle.

In some embodiments, Co—Ni alloy nanoparticles were prepared. For $Co_{0.5}$—$Ni_{0.5}$ nanoparticles, a 50 mL aqueous solution containing $1\times10^{-4}$ M $CoCl_2$, $1\times10^{-4}$ M $NiSO_4$, $3\times10^{-4}$ M sodium citrate, 0.5 M methanol, and $1.5\times10^{-2}$ M poly-vinyl alcohol (PVA, $M_W$, 88,000) was deaerated by bubbling an inert gas through the solution for sufficient time to remove dissolved oxygen. The deaerated solution was then irradiated at a dose rate of 435 rad/s for 36 min. The reaction was carried out in a 100 mL vessel which was equipped with a sidearm containing a 0.5 cm optical path, and was sealed with two septa. This allowed for the collection of UV-vis spectra without exposing the solution to air. Full reduction of the metal ions was determined to have been achieved when there was no change in UV-visible spectra upon additional irradiation. Specimens for TEM were prepared by dropping the solution on a titanium-carbon grid and removing solvent under $N_2$ gas in a glovebox to exclude oxygen during the drying process.

In other embodiments, Pd—Ni nanoparticles have been formed. For $Pd_{0.5}$—$Ni_{0.5}$ (50% Pd and 50% Ni) alloy nanoparticle preparation, a 50 mL aqueous solution containing $1\times10^{-4}$ M $Pd(NH_3)_4Cl_2$, $1\times10^{-4}$ M $NiSO_4$, $3\times10^{-4}$ M sodium citrate, 0.5 M methanol, and $1.5\times10^{-2}$ M poly-vinyl alcohol (PVA, $M_W$, 88,000) was deaerated for 12 minutes bubbling Ar through the solution. The deaerated solution was irradiated at a dose rate of 300 rad/s for 36 min. The reaction was carried out in a 100 mL vessel which was equipped with a sidearm containing a 0.5 cm optical path, and was sealed with two septa. This allowed for the collection of UV-visible spectra without exposing the solution to air. Full reduction of the metal ions was determined when there was no change in UV-vis spectra upon additional irradiation. Specimens for TEM were prepared by dropping the solution on a titanium-carbon grid and subsequent drying under $N_2$ gas in a glovebox. To examine whether Ag—Ni NPs were stable to dealloying, TEM grids with NPs were heated at 125° C. for 6 hr and at 100° C. for 9 hr in a vacuum oven.

In one embodiment, a high dose rate of gamma irradiation was applied to a deaerated solution under an inert gas atmosphere to produce kinetically favored Ag—Ni alloy nanoparticles that were approximately half Ag and half Ni where the solid composition was a substantially homogeneous mixture of Ag and Ni rather than a core-shell structure. Lattice spacings intermediate between the lattice spacing of the pure metals are obtained for nanoparticles made by various embodiments of this invention.

The large lattice mismatch between Ag and Ni makes the formation of a core-shell structure the most thermodynamically favorable. However, in an embodiment of this present invention, stable small Ag—Ni alloy nanoparticles of <10 nm in diameter have been synthesized using a radiolytic approach. Ag—Ni alloy nanoparticles and $Pd_{0.5}$—$Ni_{0.5}$ alloy nanoparticles have been synthesized at room temperature in a deaerated solution under an inert gas atmosphere in various embodiments of the high-dose rate radiolytic method of this invention. The $Ag_x$—$Ni_{1-x}$ and $Pd_{0.5}$—$Ni_{0.5}$ nanoparticles were characterized by UV-visible spectroscopy, TEM/HR-TEM (transmission electron microscopy/high-resolution transmission electron microscopy), HAADF-STEM (high-angle annular dark-field scanning transmission electron microscopy), and EFTEM (energy-filtered transmission electron microscopy) mapping. The analytical results confirm that homogenous alloy nanoparticles were made, as opposed to core-shell NPs that might be expected on thermodynamic and/or miscibility considerations. Single particle EDX (energy-dispersive X-ray spectroscopy) shows that both Ag/Ni and Pd/Ni, respectively, are present within each particle. The consistency from both the shape and spatial distribution of nanoparticles in EFTEM maps indicate that both Ag (or Pd) and Ni are present, and both components are homogeneously distributed within the particle. In addition, results from an EFTEM map show that Ni and Ag are present in a wide variety of ratios for Ag—Ni nanoparticles ($Ag_{0.9}$—$Ni_{0.1}$, $Ag_{0.7}$—$Ni_{0.3}$, $Ag_{0.5}$—$Ni_{0.5}$, and $Ag_{0.3}$—$Ni_{0.7}$), depending on the starting ratio of metal salts in the reaction solution, and that the homogeneity is retained for different compositions.

A combination of room-temperature synthesis, characterization, and first principles modeling to explore metastable phase spaces of various Ni-based alloy nanoparticle formations have been employed. In the synthesis, different stoichiometries of Ag—Ni nanoparticles were prepared using the following radiolytic methodology. A 50 mL aqueous solution containing from 0 to $2\times10^{-4}$ M $AgClO_4$, from 2 to $0\times10^{-4}$ M $NiSO_4$, $3\times10^{-4}$ M sodium citrate, 0.5 M methanol, and $1.5\times10^{-2}$ M poly-vinyl alcohol (PVA, $M_W$, 88,000) was deaerated to remove dissolved oxygen by bubbling Ar through the solution for 12 min. Other inert gases, such as, for example, $N_2$, may also be employed as long as adequate removal of oxygen from the solution is achieved. An inert gas atmosphere is maintained in contact with the solution surface during the radiolytic reaction. The deaerated solution was irradiated using a $^{60}$Co-γ source at a dose rate of 300 rad/s for 18 min. This corresponds to approximately four to seven times the calculated radiation dose for total reduction of $Ag^+$ and $Ni^{2+}$. The selected total dose depends on the concentration of metal ions ($Ag^+$ and $Ni^{2+}$ in these embodiments) that are to be reduced. The dose rate is selected to maintain the reaction in the kinetically controlled regime. The combined concentration of $Ag^+$ and $Ni^{2+}$ was kept at $2\times10^{-4}$ M while the ratio was adjusted to achieve nanoparticles of different stoichiometries. Tables 1 and 2 presented in FIG. 3 provide a summary of concentrations employed for a selection of alloy nanoparticle compositions.

PVA may scavenge hydroxyl radical (.OH) to form methanol and has weak complexation ability with metallic nanoparticles. It also provides good steric stabilization of nanoparticles. Citrate ions help stabilize various metal sols (e.g., Ag), but the concentration of citrate can affect particle shape and size distribution. Other particle stabilization species may also be employed in embodiments of this invention.

Thermal treatments were employed to study the stability and durability of nanoparticles formed in some embodiments of this invention. For example, TEM grids bearing dried $Ag_{0.5}$—$Ni_{0.5}$ nanoparticles (an alloy of 50% Ag and 50% Ni) were heated at 125° C. for 6 hr. and at 100° C. for 9 hr. in a vacuum oven. Characterization using HRTEM following this thermal treatment show that no dealloying occurred in the Ag—Ni nanoparticles.

In embodiments of this invention, alloy nanoparticles of each of the following binary metal combinations have been synthesized: Ag/Ni and Pd/Ni compositions (% of each element listed in order respectively): 100/0, 90/10, 30/70, 50/50, 70/30, 10/90, 0/100. Table 2 presents metal ion concentrations employed for making nanoparticles of these compositions. It is to be expected that compositions intermediate between the demonstrated compositions can also be formed in embodiments of this method by adjusting the relative concentration of ions of each metal in the reaction solution.

As described above, demonstrated embodiments include the formation of alloy nanoparticles of W/Ni, Co/Ni, and Ag/Ni. It is to be expected that a wide variety of homogeneous alloy nanoparticles can be made in various embodiments of this invention using combinations of metals, including combinations that might be immiscible at a particular molar ratio in the solid phase. Examples of suitable metal combinations for use in embodiments of this invention where immiscibility or stoichiometric limitations are overcome include but are not restricted to Ag/Pb, Sn/Pb, Zn/Pb, Cu/Pb, Cu/Ag, Cu/Co, Cu/W, Cu/Mo, Fe/Ag, Au/Ni, Pt/Ni, Al/Pb and other combinations wherein the ratios of radii are such as to preclude formation of a miscible alloy for a particular atomic fraction each of the metals in the combination. Additional embodiments of this invention can employ combinations of three or more metals. In such embodiments, again alloy combinations can be achieve even when one or more of the participating metals is generally immiscible in the combination at a particular atomic ratio. Embodiments of this invention may be employed to make nanoparticles of superalloys; examples include but are not restricted to superalloy metal combinations such as W/Ni/Fe, W/Ni, W/Mo/Co, W/Co, Co/Ni, and Co/Ni/Fe, Mo/Ni, and Mo/Ni/Fe. Deaeration of reaction solutions precludes many oxidation reactions that can interfere in the formation of the desired alloy nanoparticles.

The following characterization techniques have been employed to confirm alloying in the nanoparticles formed in various embodiments of this invention. UV-visible absorption spectra were taken on a Varian Cary 300 Scan UV-Visible Spectrophotometer. Mean particle diameters, particle size distribution, and morphology were determined by using a JEOL 1200EX (120 kV) bright-field transmission electron microscopy (TEM) with Gatan digital imaging. High-resolution TEM and scanning TEM images were acquired using an FEI Tecnai G(2) F30 S-Twin (300 kV) TEM. This instrument is equipped with Z-contrast capability (to image different elements) with a resolution of 0.14 nm in high-angle annular dark-field (HAADF) mode. The unit is also equipped with energy-dispersive X-ray (EDX) analysis for detection of characteristic x-rays for elemental analysis, and with an electron energy-loss spectrometer (EELS) for characterizing composition and energy-filtered imaging.

Figure 4:
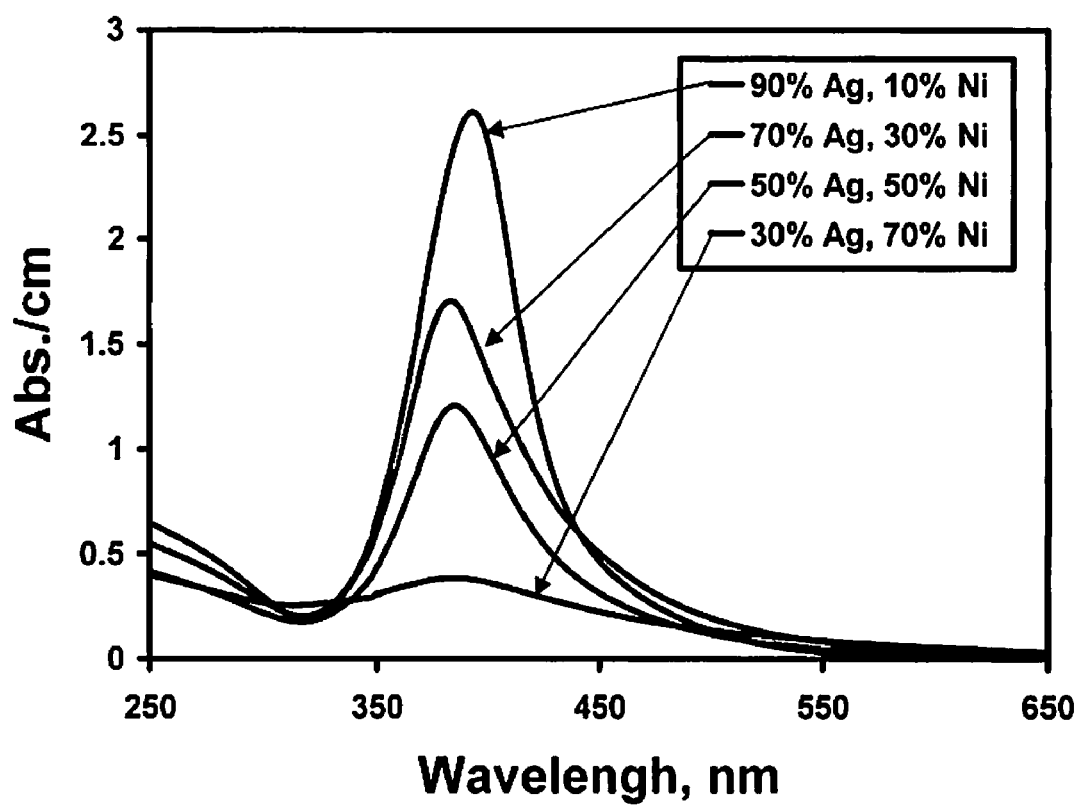
FIG. 4 presents UV-visible spectra of Ag—Ni nanoalloys as-synthesized after irradiation (full reduction). The spectra are from Ag—Ni nanoalloys of 90% Ag, 10% Ni; 70% Ag, 30% Ni; 50% Ag, 50% Ni; and 30% Ag, 70% Ni.

Characterization results for an embodiment producing 50% Ag and 50% Ni ($Ag_{0.5}$—$Ni_{0.5}$) nanoparticles is described below. FIG. 4 shows a solution UV-visible spectrum of Ag—Ni nanoalloys as-synthesized after 18 min irradiation. From TEM measurements, it has been determined that the typical particle size for this sample is less than 10 nm. The 50% Ag in the alloy has a characteristic plasmon band at 383 nm. According to Mie theoretic calculations, the absorption spectrum for Ni has a very weak peak around 330 nm. Most literatures reports show no absorption band for Ni nanoparticles, but the presence of Ni can dampen the Ag plasmon band and shift it to shorter wavelengths (blue-shift). In embodiments of this invention, the absorption of $Ag_{0.5}$—$Ni_{0.5}$ NPs is higher than that of $Ag_{0.3}$—$Ni_{0.7}$ NPs, but lower than that of $Ag_{0.7}$—$Ni_{0.3}$ and $Ag_{0.9}$—$Ni_{0.1}$.

TEM images of Ag—Ni alloy nanoparticles as-synthesized and after 6 days aging show less than a 10% change in particle size when aged in the original reaction solution.

PVA may scavenge hydroxyl radical (.OH) to form methanol and has weak complexation ability with metallic nanoparticles. It also provides good steric isolation between nanoparticles. Citrate ions provide good stability to Ag sols and can serve as particle stabilization agents. Other particle stabilization species can also be employed; examples include but are not limited to polyacrylate. The concentration of citrate can affect the particle shape and size distribution. With both stabilizers, the as-synthesized $Ag_{0.5}$—$Ni_{0.5}$ nanoparticles are spherical and the size is about 5.8 nm in diameter with a narrow size distribution of ±10%. Up to 6 days of aging in the original reaction solution, there is a damping and red shift of the band in UV-visible spectra. After 6 days there is no further change in spectra, indicating no further change in particle size. The damping and shift may be caused by a ripening process since the particle size increases slightly during the aging period to 6.8 nm.

A commonly employed technique for determining the structure of small nanoparticles is the high resolution transmission electron microscopy (HRTEM). Considerations in interpreting high-resolution images from randomly oriented nanoparticles include particle tilt, shape and edge effects. The Ag—Ni nanoparticles of an embodiment of this invention were randomly deposited on TEM grids and HRTEM; various orientations of these nanoparticles with respect to the instrument were obtained. Without the use of image simulation, one of the most easily examined orientations is [110] with the dihedral angle between {111} reflections 70.5°. The (111) spacings of Ni and Ag are 0.203 nm and 0.236 nm, respectively. For metals with the same crystal structure, Vegard's law predicts a simple linear relationship between alloy composition and lattice spacings. Based upon the prediction of Vegard's law, the lattice spacing of 50% Ag and 50% Ni is expected to be approximately 0.220 nm. A decahedron-like Ag—Ni nanoparticle of 7 nm diameter in a 5-fold orientation was examined by HRTEM. The dihedral angle of one pair of {111} reflections was 69.8° and the (111) spacings were 0.223 nm and 0.226 nm, which differ by less than 2% from the Vegard prediction. A HRTEM image of another particle of nominally the same composition had spacings of approximately 0.218 nm These HRTEM results demonstrate that the expected lattice spacing of an alloy of 50% Ag and 50% Ni appears to be present in the alloy nanoparticles made in embodiments of this invention.

It is possible to distinguish the presence of a core-shell structure by TEM or HRTEM. TEM results for clear core-shell nanoparticles are known to show the presence of both the core and the shell in the image. Neither the TEM nor the HRTEM images shows the core-shell structure in the Ag—Ni nanoparticle made in embodiments of this invention, showing that the nanoparticles made in an embodiment of the present invention are alloyed nanoparticles of substantially uniform composition and not core-shell nanoparticles with a core and a shell of different compositions.

High-angle annular dark-field scanning-transmission electron microscopy (HAADF-STEM), also known as Z-contrast imaging, has become established as a powerful technique for visualizing structure and chemical information of nanoscale nanoparticles. For images in HAADF-STEM, the contribution of the Bragg reflections is minimized and incoherent elastic scattering becomes the prevailing contribution to the image intensity when image are recorded in a FEG (S)TEM (field-emission electron gun (scanning) transmission electron microscope) with an annular detector at large inner angles. As such HAADF images show little or no diffraction effects, and their intensity is approximately proportional to $Z^2$, HAADF-STEM images usually exhibit a small signal-to-noise ratio and qualitative interpretation of these images is relatively straightforward. The intensity difference from atomic numbers (Z) of Au and Pd gave a clear contrast in HAADF images and showed the core-shell structure of Au—Pd bimetallic nanoparticles made by previous methods. HAADF-STEM images from the Ag—Ni nanoparticles of embodiments of this invention do not exhibit core-shell characteristics. Rather, the HAADF-STEM images show that Ag and Ni are homogeneously distributed throughout each nanoparticle. Analysis of one nanoparticle characterized by HAADF-STEM was analyzed by EDX; the analysis shows the presence of both Ag and Ni, as expected for the alloy nanoparticle.

Energy filtered transmission electron microscopy (EFTEM) can be used to study the spatial distribution of the various chemical elements in a relatively large field of view. Elemental mapping by EFTEM is a microanalytical technique based on electron energy loss (EEL) spectrometry which can provide much new information on particle chemical uniformity and topochemistry, and distribution of chemical components with high spatial resolution. This elemental map can be formed by imaging transmitted electrons that have lost energies corresponding to inner-shell ionization edges which are characteristic for particular elements. The elemental distribution images can be recorded with atomic or nanometer resolution. The Ag and Ni maps indicate that both Ag and Ni are present in the nanoalloy nanoparticles. The shape of the image spots generated by electrons from both Ag and Ni are the same. This is consistent with the Ag and Ni being uniformly distributed in the whole particle. Thus, HRTEM, HAADF-STEM, and EFTEM map results are all consistent with the homogeneous distribution of Ag and Ni in the $Ag_{0.5}$—$Ni_{0.5}$ bimetallic alloy nanoparticles of this embodiment.

The alloy nanoparticles of various embodiments of this invention exhibit thermal stability against alloy segregation effects at moderate temperatures. To examine the possibility of instabilities in the nanoparticles, TEM grids holding Ag—Ni nanoparticles were heated at 125° C. for 6 hr. and at 100° C. for 9 hr. in a vacuum oven. Post-heating characterization indicated no dealloying occurred in the Ag—Ni nanoparticles The HAADF-STEM image of the thermally treated nanoparticles shows homogeneity of Ag—Ni nanoalloys. EDX results confirm the presence of Ag and Ni. EFTEM maps also demonstrate that both Ag and Ni are present and that spatial distribution within nanoparticles in both images is consistent with that observed before heating.

The following mechanism of nanoparticle formation in consistent with the experimental results described above for AgNi nanoparticles. The description below is expressed in terms of Ag and Ni, but it is also applicable to other embodiments, such as those described above for W, Co, Ni, and other metals, where the specific values of the oxidation potentials depend on the particular metal involved but the mechanistic considerations are the same. For example for cobalt, $E°(Co^{2+}/Co^0)$ is −0.28 V. For tungsten, $E°(WO_4^{2−}/WO_2^−)$ and $E°(WO_2^−/NW^0)$ are −1.259 V and −0.87 V, respectively, at 25° for aqueous solutions. Gamma (γ)-irradiation creates hydrated electrons, H atoms and hydroxyl radicals (.OH). The solvated electron species in this embodiment and in other embodiments performed in aqueous solution is a hydrated electron. It is well established that methanol can scavenge H atoms and hydroxyl radicals (Eq. 1) and the yield of hydroxymethyl radicals (.$CH_2OH$) is 4.4/100 eV if oxidation from $H_2O_2$ is considered. The hydrated electrons and hydroxymethyl radicals can reduce $Ag^+$ and $Ni^{2+}$ to produce Ag—Ni nanoalloys.

$$.OH(H.)+CH_3OH \rightarrow H_2O(H_2)+.CH_2OH \qquad \text{(Eqn. 1)}$$

Therefore, there are two reducing species formed in the aqueous solution upon γ-irradiation, hydrated electrons and hydroxymethyl radicals (.$CH_2OH$). The redox potentials of hydrated electrons and hydroxymethyl radicals are −2.7 V and −1.18 V, respectively. Evidence indicates that $Ag^+$ and $Ni^{2+}$ are reduced by these two reducing species to form Ag—Ni nanoalloys. However, previous experiments indicate that it was very inefficient (e.g. very low yield of metal atoms) or difficult (e.g. induction time) for radicals to reduce $Ag^+$ in the absence of nanoparticles. The redox potentials of $Ag^0$ (Ag atom) and $Ag_{bulk}$ are at least −1.8 V (from Henglein) and 0.8 V, respectively. From Henglein, room temperature $\Delta G_{sub}$=2.60 eV for Ag bulk. Other reports indicated $\Delta G_{sub}$=2.94 eV, therefore, $E°(Ag^+/Ag^0)$=−2.1 V. The difference between $E°(Ag^+/Ag^0)$ and $E°(Ag^+/Ag_{bulk})$ is the sublimation or atomization energy of silver. Therefore, it is expected that it is difficult for hydroxymethyl radicals (.$CH_2OH$, −1.18 V) to reduce $Ag^+$ to Ag atom in the absence of nanoparticles due to the very negative potential of $Ag^0$ (−2.1 V). The redox potential of Ni atom $E°(Ni^{2+}/Ni^0)$, $Ni^{2+}$ $E°(Ni^{2+}/Ni^+)$, and $Ni^+$ $E°(Ni^+/Ni^0)$ is −2.2 V, −2.7 V, and −1.7 V, respectively. Similarly, in the absence of nanoparticles, hydroxymethyl radicals can not reduce $Ni^{2+}$ to Ni atom. Therefore, $Ag^+$ and $Ni^{2+}$ are almost solely reduced by hydrated electrons at the very beginning of the reaction. Similar to the case of Ag, hydrated electrons generate $(AgNi)_x$ alloy clusters, which may have a diameter of less than 1 nm and are the nuclei for particle growth.

Radicals can transfer electrons to small metallic particles and form the so called electron pool on particles. In embodiments of this invention, .$CH_2OH$ radicals donate electrons to $(AgNi)_x$ clusters and generate electron pools. $Ag^+$, $Ni^{2+}$, and $Ni^+$ ($Ni^{2+}$ can undergo $e_{aq}^−$/.$CH_2OH+Ni^{2+} \rightarrow Ni^+$, $2Ni^+ \rightarrow Ni^0+Ni^{2+}$) can accept electrons from $(AgNi)_x$ clusters and get reduced at the surface of these clusters. Therefore, $(AgNi)_x$ clusters grow and form nanoparticles. The competing reactions of this growth process are hydrogen formation by stored electrons in clusters.

Belloni et al. (J. Phys. Chem. B. vol 102, (1998) pp. 4310-4321) used the γ-irradiation method to synthesize nanoparticles of the normally miscible metals Au and Ag as a function of dose rate. Au and Ag are normally miscible at any ratio. Belloni et al. found that, at low dose rates (0.25 or 3.8 kGy/h, which correspond to 6.9 or 106 rad/s), the less noble metal ions (i.e. Ag) act as an electron relay towards the more noble metal ions (i.e. Au), as illustrated in Eq. 2 and 3 below. Thus, monometallic clusters $Au_m$ are formed first and then, when Au ions are exhausted, $Ag^+$ ions are reduced afterwards at the surface of $Au_m$. The final result is a core-shell cluster where the more noble metal Au is coated by the less noble metal Ag. However, if a high dose rate (35 kGy/h, i.e. 972 rad/s) is applied, the intermetallic electron transfer becomes ineffective due to an intermetallic electron transfer quench mechanism between radicals in solution. Radicals can transfer electrons to small metallic particles and form an electron pool on the particles, thereby allowing bimetallic clusters to grow and form nanoparticles. Thus an Au—Ag alloy is formed.

$$N+M^+ \rightarrow (NM)^+ \rightarrow N^+ + M \qquad (2)$$

$$(M_mN_n)^{x+}+M^+ \rightarrow (M_{m+1}N_n)^{(x+1)+} \rightarrow (M_{m+1}N_{n-1})^{x+}+N^+ \qquad (3)$$

where N is less noble metal (e.g. Ag) and M is more noble metal (e.g. Au).

In the case of Ag and Ni, Ag is more noble than Ni, i.e., Ag has a more positive redox potential. Therefore, at low radiation dose rate, Ag core-Ni shell nanoparticles should be formed. This conclusion is contrary to the results from Cottancin's experiments and opposite of what simulations and calculations predict, i.e., a thermodynamically stable Ni core-Ag shell structure. However, experiments also show that silver ions can be reduced by Ni nanoparticles, and Ag nanoparticles were thus formed.

A high dose rate (greater than approximately 300 rad/sec) was used in embodiments of this invention to produce substantially homogeneous, thermally stable Ag—Ni alloy nanoparticles. High radiation dose rates reduce both Ag and Ni ions within a very short time, a time that is significantly shorter than any other electrochemical or thermodynamic process so that the rapid reduction of both species is dominant over the potential intermetallic electron transfer between Ag and Ni. Such a high dose rate can produce sufficient concentrations of electrons to reduce both Ag and Ni to quickly incorporate their atoms into the solid lattice; this results in an alloy structure with substantially the same metal ratio as the concentration ratio of the metal ionic precursors. This makes formation of the alloy structure kinetically favorable above radiation dose rates that supply an adequate concentration of electrons. An effective concentration of solvated electrons is a concentration that favors kinetic reaction control over thermodynamic reaction control.

For embodiments of this invention, a radiation dose rate is employed that effectively reduces the two or more types of metals sufficiently simultaneously that they are available to be incorporated into the nanoparticles as a substantially homogeneous alloy instead of forming an elementally segregated core-shell structure as would be expected from thermodynamic consideration. This use of radiation to place the process in a kinetically controlled regime enables the formation of substantially homogeneous alloy nanoparticles of metals, including metals that are normally immiscible at a given atomic ratio. In the case of embodiments involving Ni and Pd, a dose rate of 300 rads/sec for 18 min. produced alloy nanoparticles instead of thermodynamically favored core-shell structures.

While the embodiments described herein employed gamma radiation as the ionizing radiation to provide electrons that rapidly reduce the metal ions to form the alloy nanoparticles, other ionizing radiation sources that are capable of forming reducing agents at concentrations corresponding to redox potentials sufficient to reduce both types of metal ions to be incorporated into the alloy may also be used. Suitable ionizing irradiation includes but is not limited to gamma irradiation, X-ray irradiation, and proton irradiation. The proton irradiation can be pulsed proton irradiation.

In one embodiment, pulsed proton irradiation was employed. The solutions were added by pipette to a quarts plate containing circular sells (1.5 mm deep holding 0.1 ml solution) and with an etched grid for beam alignment. Samples were added to the wells under inert atmosphere and wells were sealed with Kapton tape. Beam alignment on the grid and in the samples was performed. Beam penetration into the solution was approximately 275 micrometers. Each sample was dosed at a predetermined current and time, repeated 10 times at different locations to ensure an evenly irradiated sample. Ion beam irradiation dose and dose rates using a Van de Graff accelerator was generally between $1 \times 10^4$ to $1 \times 10^6$ rads with a maximum dose rate of approximately $1 \times 10^6$ rad/sec. The ion-beam-formed nanoparticles included Au, Pd, Ni, and alloys (Ag/Au, Ag/Ni, and Ni/Pd). Aqueous reaction solutions of $10^{-3}$ M metal salt, 0.2M alcohol, 1% organic solution, and water. The metal salts used were $AuCl_3$, $PdNO_3$, and/or $NiSO_4$. For the formation in ion-beam-based embodiments of nanoparticles of W, Mo, Ni, Co, Fe, and alloys thereof, a wide variety of suitable salts may be used as sources of the metal; these include but are not restricted to halides and sulfates. Metal ion solutions suitable for use with gamma irradiation may also be employed with proton irradiation. The alcohol was isopropyl alcohol, and the organic of the organic solution was either polyvinyl alcohol (PVA) or polyacrylate (PA). The PVA is employed because it is not known to reduce the metal ions in solution and is aids in stabilizing the nanoparticles. PA may be employed to slow down cluster formation.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for forming alloy nanoparticles, the method comprising:
    forming a solution comprising ionic source compounds of at least a pair of metals, an electron solvation species, and optionally a reducing radical source species;
    deaerating the solution with an inert gas to form a deaerated reaction solution;
    irradiating the deaerated reaction solution with ionizing radiation at a dose rate sufficient to form an effective concentration of solvated electrons bound to the electron solvation species for reducing the ionic source compounds and optionally a concentration of reducing radicals formed from the reducing radical source species;
    reducing the ionic source compounds to grow a plurality of alloy nanoparticles comprising at least the pair of metals distributed uniformly in the alloy nanoparticles.

2. The method of claim 1, wherein the inert gas is selected from the group consisting of $N_2$, He, Ne, Ar, Kr, Xe, and mixtures thereof with low concentrations of $H_2$.

3. The method of claim 1, wherein the ionizing radiation is selected from the group consisting of gamma radiation, X-ray radiation, and proton irradiation.

4. The method of claim 1, wherein the dose rate is greater 250 rad/sec.

5. The method of claim 1, wherein a concentration of each ionic source compound is less than approximately $1 \times 10^{-3}$ mol/L.

6. The method of claim 1, wherein the pair of metals are immiscible metals.

7. The method of claim 1, wherein at least one of the pair of metals is tungsten.

8. The method of claim 1, wherein the pair of metals is selected from the group consisting of the pair of Co and Ni and the pair of W and Ni.

9. The method of claim 1, wherein the ionic source compounds are $AgClO_4$ and $NiSO_4$, the electron solvation species is water, and the reducing radical source species is methanol.

10. The method of claim 1, wherein the solution further comprises a particle stabilization species.

11. A method for forming tungsten-containing nanoparticles, the method comprising:
- forming a solution comprising an ionic source compound of tungsten and optionally an ionic source compound of a different metal, an electron solvation species, and optionally a reducing radical source species;
- deaerating the solution with an inert gas to form a deaerated reaction solution;
- irradiating the deaerated reaction solution with ionizing radiation at a dose rate sufficient to form an effective concentration of solvated electrons bound to the electron solvation species and optionally a concentration of reducing radicals formed from the reducing radical source species for reducing at least one ionic source compound;
- reducing the ionic source compound of tungsten and optionally the ionic source compound of the different metal to grow a plurality of tungsten-containing nanoparticles.

12. The method of claim 11, wherein the different metal is nickel.

13. The method of claim 11, wherein the different metal selected from the group consisting of Ni, Co, Mo, Fe, and combinations thereof.

14. The method of claim 11, wherein the inert gas is selected from the group consisting of $N_2$, He, Ne, Ar, Kr, Xe, and mixtures thereof with low concentrations of $H_2$.

15. The method of claim 11, wherein the ionizing radiation is selected from the group consisting of gamma radiation, X-ray radiation, and proton irradiation.

16. The method of claim 11, wherein the dose rate is greater 250 rad/sec.

17. The method of claim 11, wherein a concentration of each ionic source compound is less than approximately $1 \times 10^{-3}$ mol/L.

* * * * *